(12) United States Patent
O'Neill, Jr. et al.

(10) Patent No.: US 6,226,398 B1
(45) Date of Patent: *May 1, 2001

(54) METHOD AND APPARATUS FOR REFORMATTING A HIGH RESOLUTION IMAGE FILE FOR PRINTING ON A LOWER RESOLUTION PRINTER

(75) Inventors: Kevin J. O'Neill, Jr., Alpharetta, GA (US); Mahendra Varman, Omaha, NE (US)

(73) Assignee: Minolta-QMS, Inc., Mobile, AL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,097

(22) Filed: Dec. 4, 1997

Related U.S. Application Data (60) Provisional application No. 60/032,355, filed on Dec. 4, 1996.

(51) Int. Cl.[7] ........................................ G06K 9/00
(52) U.S. Cl. ................ 382/162; 382/128; 382/168; 382/274
(58) Field of Search ................ 382/169, 131, 382/132, 162, 168, 128, 298–300, 274; 358/1.13–1.1, 1.2, 1.9; 378/62; 250/337, 587, 582; 345/127, 515

(56) References Cited

U.S. PATENT DOCUMENTS

| | | | |
|---|---|---|---|
| 4,254,409 | 3/1981 | Busby | 345/127 |
| 4,302,672 * | 11/1981 | Kato et al. | 250/582 |
| 4,942,541 | 7/1990 | Hoel et al. | 358/1.16 |
| 5,272,760 * | 12/1993 | Echerer et al. | 382/132 |
| 5,293,466 | 3/1994 | Bringmann | 358/1.15 |
| 5,426,709 * | 6/1995 | Yoshida et al. | 382/132 |
| 5,644,649 * | 7/1997 | Schoeters et al. | 382/132 |
| 5,644,650 * | 7/1997 | Suzuki et al. | 382/132 |
| 5,651,042 * | 7/1997 | Dewaele | 378/62 |
| 5,760,920 * | 6/1998 | Lin et al. | 358/457 |
| 5,848,179 * | 12/1998 | Braet | 382/132 |
| 5,852,648 * | 12/1998 | Miyamoto et al. | 378/62 |
| 5,883,985 * | 3/1999 | Pourjavid | 382/274 |

OTHER PUBLICATIONS

"Contrast Limited Adaptive Histogram Equalization". by Karel Zuiderveld. Computer Vision Research Group, Utrecht University, Utrecht. The Netherlands, Copyright 1994 by Academic Press, Inc.

* cited by examiner

Primary Examiner—Leo Boudreau
Assistant Examiner—Ishrat Sherali
(74) Attorney, Agent, or Firm—Webb Ziesenheim Logsdon Orkin & Hanson, P.C.

(57) ABSTRACT

In a method and apparatus for obtaining a hard copy of an electronic image, a plurality of image luminescence values corresponding to pixels of an electronic image are received and a probability distribution of the plurality of image luminescence values is generated. Each image luminescence value has a first binary bit length. From the probability distribution, the luminescence values having less than a desired quantity of image luminescence values associated therewith are determined. Two or more adjacent groups of continuous luminescence values are identified from the probability distribution. Each luminescence value of each group has greater than or equal to the desired quantity of image luminescence values associated therewith. The two or more adjacent groups are separated by one or more of the luminescence values having less than the desired quantity of image luminescence values associated therewith. The two or more adjacent groups of image luminescence values and the luminescence values therebetween are scaled to obtain a plurality of printer luminescence values having a second bit length less than the first bit length. The printer luminescence values are printed to obtain a hard copy of the electronic image.

15 Claims, 7 Drawing Sheets

|     | 512 | 511 | 510 | 509 |     | 3   | 2   | 1   | 0   |
| --- | --- | --- | --- | --- | --- | --- | --- | --- | --- |
| 512 | 16  | 16  | 17  | 17  |     | 27  | 28  | 29  | 30  |
| 511 | 17  | 17  | 17  | 17  |     | 27  | 27  | 28  | 29  |
| 510 | 17  | 17  | 18  | 18  |     | 26  | 27  | 27  | 28  |
| 509 | 17  | 18  | 18  | 19  |     | 25  | 25  | 26  | 26  |
|     |     |     |     |     |     |     |     |     |     |
| 257 | 68  | 64  | 72  |     |     | 216 | 223 | 220 |     |
| 256 | 83  | 87  | 79  |     |     | 196 | 234 | 200 |     |
| 255 | 107 | 111 | 102 |     |     | 176 | 250 | 180 |     |
|     | 130 | 134 | 126 |     |     | 172 | 164 | 168 |     |
|     |     |     |     |     |     |     |     |     |     |
| 3   | 1   | 1   | 1   | 1   |     | 65  | 54  | 53  | 52  |
| 2   | 2   | 1   | 1   | 1   |     | 54  | 53  | 52  | 51  |
| 1   | 2   | 2   | 1   | 1   |     | 53  | 52  | 51  | 51  |
| 0   | 2   | 2   | 2   | 1   |     | 52  | 51  | 51  | 50  |

FIG. 6

METHOD AND APPARATUS FOR REFORMATTING A HIGH RESOLUTION IMAGE FILE FOR PRINTING ON A LOWER RESOLUTION PRINTER

CROSS REFERENCE TO RELATED APPLICATION

This application claims the benefit of earlier filed United States Provisional Patent Application Ser. No. 60/032,355, filed on Dec. 4, 1996.

BACKGROUND OF THE INVENTION

1. Field of the Invention

The present invention relates to printing and more specifically to printing image files obtained from medical diagnostic imaging systems.

2. Description of the Prior Art

The various modalities of medical diagnostic imaging systems, such as X-ray machines, ultrasound machines, CTs and MRIs, include one or more detectors for detecting image information produced by the interaction of the modality with the patient. These detectors typically include convertors for converting analog signals received thereby into digital signals that can be processed by a digital computer into an image file representative of the portion of the patient being imaged. The image files can be processed by the digital computer of the imaging system to produce on a monitor, such as a CRT, a visually perceptive image of the body part imaged by the imaging system. More specifically, the digital computer processes the digital signals from the detector into, among other things, luminescence values associated with each pixel of the image displayed on the monitor. Each pixel may also have associated therewith color and hue information.

It is common for an imaging system to process the received signals into a high resolution image which is provided to the monitor, preferably a high definition monitor which is capable of reproducing the high resolution image. In order to process these high resolution images, each pixel of the high resolution image may have associated therewith a luminescence value having 12 to 16 bits of resolution. The ability of the monitor to produce luminescence values having between 12 and 16 bits of resolution permits the imaging system to produce a high definition picture of the imaged portion of the patient.

While such high definition pictures are desirable, it is often desirable to produce hard copies of the imaged portion of the patient. In this respect, it is still common practice for X-ray machines to produce images on film based media. Limitations of film based media, however, include the use of hazardous chemicals for developing and the cost of replication, storage and retrieval of film based media. Hard copies of imaged portions of the patient may also be produced by providing image files to a printer having the same resolution as the luminescence values of the image file. Limitations of such a printer, however, is its cost and its relatively low availability with respect to more commonly available printers having lower resolution. While it is desirable to produce hard copies of diagnostic images from image files utilizing commonly available printers, the resolution of these printers for each luminescence value is typically limited to 8 bits. Hence, detail from the actual image is lost thereby limiting the usefulness of such hard copy images.

It is an object of the present invention to provide a printer which adaptively adjusts the scaling of its printer luminescence values to the luminescence values of a histogram containing one or more groups of image luminescence values containing the most diagnostically useful image information. It is an object of the present invention to provide a method for adaptively converting the scaling of printer luminescence values to image luminescence values containing more diagnostically useful image information.

SUMMARY OF THE INVENTION

Accordingly, we have invented a method of producing a hard copy of an electronic image. The method includes receiving a plurality of image luminescence values each corresponding to one of a color and a shade of gray of a pixel of an electronic image. A distribution of luminescence values is generated from the plurality of image luminescence values. The luminescence values in the distribution having less than a desired quantity of image luminescence values associated therewith are determined. A group of continuous luminescence values each having one of greater than and equal to the desired quantity of image luminescence values associated therewith are identified in the distribution. The distribution includes on each side of the group of continuous luminescence values a boundary of the distribution or one of the luminescence values having less than the desired quantity of image luminescence values associated therewith. The group of continuous luminescence values are scaled to obtain a plurality of printer luminescence values and each printer luminescence value is printed to obtain a hard copy of the electronic image represented thereby.

The method can also include the steps of identifying in the distribution a plurality of groups of continuous luminescence values that are separated from each other in the distribution by at least one luminescence value having less than the desired quantity of image luminescence values associated therewith. Each luminescence value of each group of continuous luminescence values has one of greater than and equal to the desired quantity of image luminescence values associated therewith. Two or more of the plurality of groups of continuous luminescence values and the luminescence values therebetween, having less than the desired quantity of image luminescence values associated therewith, are scaled to obtain a plurality of printer luminescence values. The two or more groups of continuous image luminescence values are preferably adjacent.

A first predetermined image luminescence value can be assigned to image luminescence values less than the scaled image luminescence values. A second predetermined image luminescence value can be assigned to image luminescence values greater than the scaled image luminescence values. Alternatively, piecewise linear or non-linear scaling can be utilized to scale the image luminescence values over the entire distribution of luminescence values.

We have also invented a printer for converting to a printed image an electronic image comprised of a plurality of image luminescence values. The printer includes a port for receiving a plurality of image luminescence values each corresponding to one of a color and a shade of gray of a pixel of an electronic image. A print controller is connected between the port and a print engine. The port provides the received plurality of image luminescence values to the print controller which forms a histogram of the distribution of the plurality of image luminescence values. The print controller determines the luminescence values of the histogram having less than a desired quantity of image luminescence values associated therewith. The print controller identifies from the histogram at least two adjacent groups of continuous luminescence values having therebetween at least one of the luminescence values having less than the desired quantity of image luminescence values associated therewith. Each luminescence value of each group has one of greater than and equal to the desired quantity of image luminescence values associated therewith. The print controller scales the identified at least two adjacent groups of continuous luminescence values and the luminescence values therebetween to obtain a plurality of printer luminescence values. The print controller causes the print engine to print each printer luminescence value to obtain a printed image corresponding to the electronic image.

The print controller can obtain from a background portion of the electronic image one or more image luminescence values. From the obtained image luminescence values a median image luminescence value can be determined and a predetermined image luminescence value can be assigned to image luminescence values below the median image luminescence value.

DESCRIPTION OF THE PREFERRED EMBODIMENTS

Figure 1:
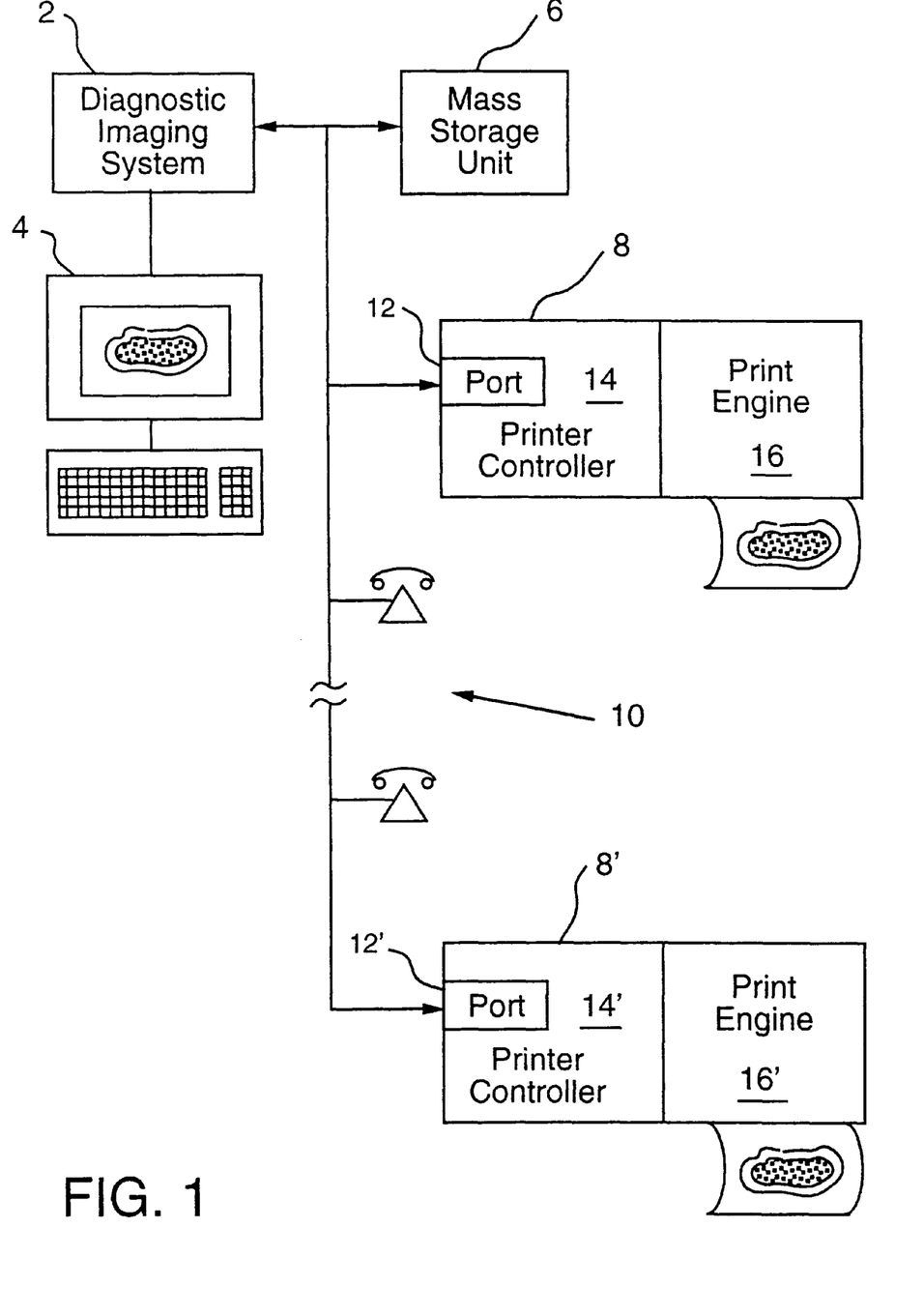
FIG. 1 is a diagram of a diagnostic imaging system having printers in accordance with the present invention connected thereto.

With reference to FIG. 1, a diagnostic imaging system 2, such as an X-ray machine, an ultrasound machine, a CT or an MRI, obtains images in a manner known in the art for the particular modality of imaging systems. The obtained diagnostic image may be viewed on a monitor 4 and/or may be stored in a mass storage unit 6 for subsequent retrieval. The obtained diagnostic image can have a generic image file format or an image file format proprietary to the manufacture of the imaging system 2. Moreover, the image files stored in the mass storage unit 6 can be compressed utilizing known compression techniques.

A printer 8 is connected to receive the image files from the diagnostic imaging system 2 or the mass storage unit 6. Each image file includes a plurality of image luminescence values corresponding to a color or a shade of gray of a pixel of an electronic image represented by the image file. As shown in FIG. 1, a printer 8' may also be connectable to receive image files from the imaging system 2 or the mass storage unit 6 via a communication network 10, such as a public switch telephone network.

An exemplary image file can include data corresponding to, for example, a 512×512 array of pixels. The data for each pixel of the image file includes an image luminescence value that corresponds to an intensity of one or more signals received for each pixel by a detector (not shown) of the imaging system 2.

In order to view the signals received by the detector, the imaging system 2 provides the image file to the monitor 4 which converts each image luminescence value into a corresponding color or a shade of gray. For example, if each image luminescence value is formed from 12 binary bits, the monitor 4 assigns the color black to an image luminescence value of 0, corresponding to all 12 bits equaling 0, and assigns the color white to an image luminescence value of 4,096 corresponding to all 12 bits having a binary value 1. The image luminescence values between black and white are assigned color values therebetween, and more particularly are assigned shades of gray that vary continuously between black and white. Hence, the image luminescence value 2,048 is assigned the color gray; the image luminescence value 1,024 is assigned a color between gray and black; and the image luminescence value 3,072 is assigned a color between gray and white. Utilizing the image luminescence values, the monitor 4 decodes the 12 bits of each luminescence value into a corresponding color or shade of gray and displays a viewable image of the image file thereon.

In contrast to the monitor 4, however, the printer 8, or 8', can only produce colors or shades of gray having 8 binary bits of resolution. Because of their availability and relatively low cost, it is desirable to produce hard copies of diagnostic images utilizing printers having 8 binary bits of resolution. This is in contrast to more expensive printers which have 12 binary bits, or more, of resolution. Moreover, it is desirable when utilizing printers having 8 binary bits of resolution to produce hard copies of diagnostic images, to retain as much resolution as possible from the original image while converting the original image from the higher bit length image luminescence values to lower bit length printer luminescence values printable by the printer 8. To this end, the printer 8 reformats each 12 bit image luminescence value into a corresponding 8 bit printer luminescence value printable thereby.

Figure 2:
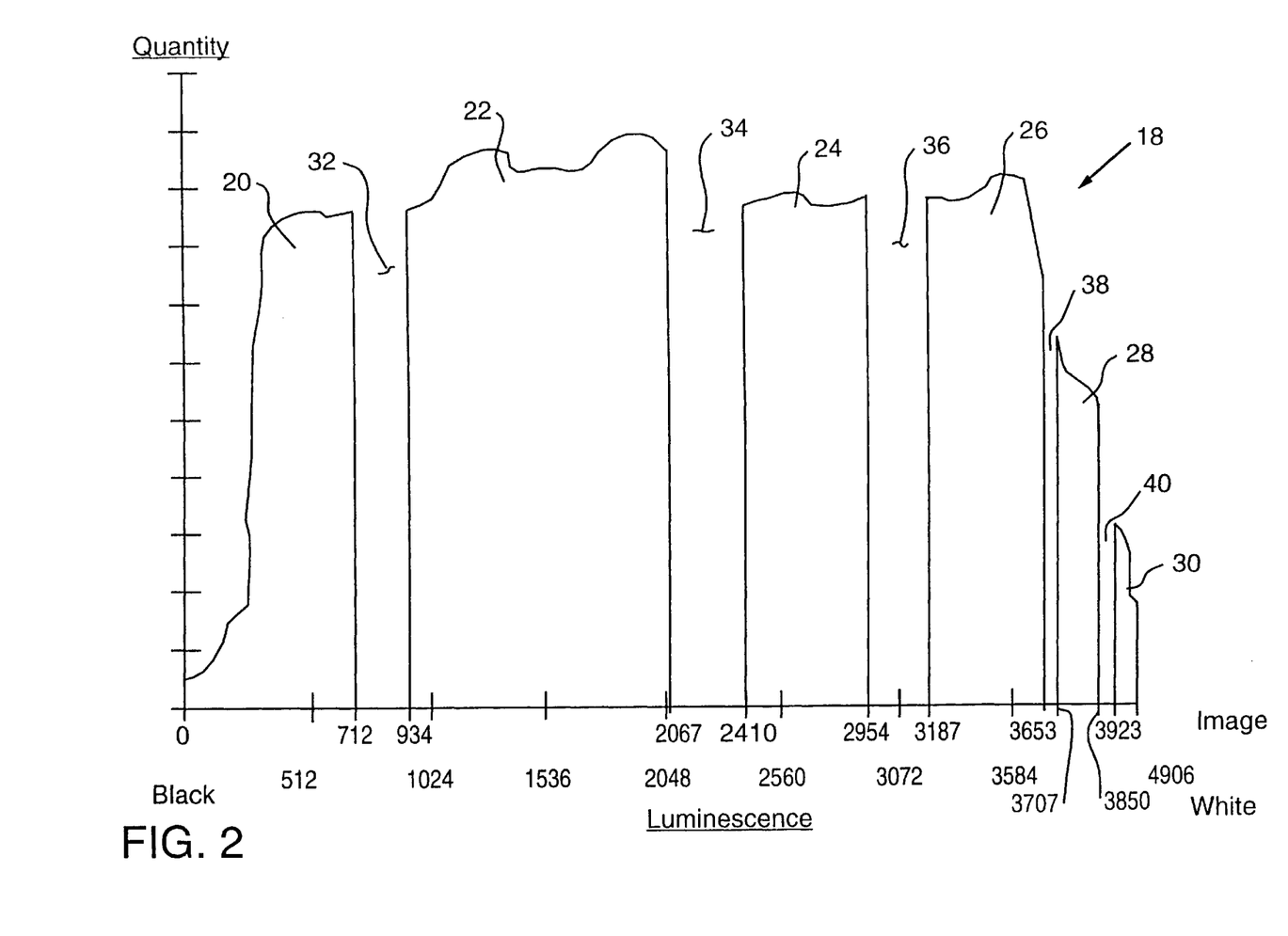
FIG. 2 is a histogram of the distribution of image luminescence values of an image file received by one of the printers in FIG. 1.

With reference to FIG. 2 and with ongoing reference to FIG. 1, the printer 8 receives, at a port 12 and from the imaging system 2 or the mass storage unit 6, an image file having a plurality of image luminescence values corresponding to an electronic image. Each of the plurality of image luminescence values corresponds to one of a color and a shade of gray of a pixel of the electronic image. The printer 8 has a printer controller 14 which generates from the plurality of image luminescence values a histogram, or probability distribution, 18 of luminescence values. As shown in the histogram 18 of an exemplary image file, the image luminescence values are clustered into groups 20, 22, 24, 26, 28 and 30 of continuous luminescence values. It is not uncommon, however, for diagnostic images to lack or have less than a desired quantity of image luminescence values associated with certain luminescence values of the histogram 18. Thus, as shown in FIG. 2, the exemplary image file lacks image luminescence values between the image luminescence values 712–934, 2,067–2,410, 2,954–3, 187, 3,653–3,707, and 3,850–3,923, which correspond to bands of luminescence values 32, 34, 36, 38 and 40, respectively. The bands of luminescence values 32, 34, 36, 38 and 40 each include at least one luminescence value having less than the desired quantity, e.g., 1, of image luminescence values associated therewith.

Figure 3:
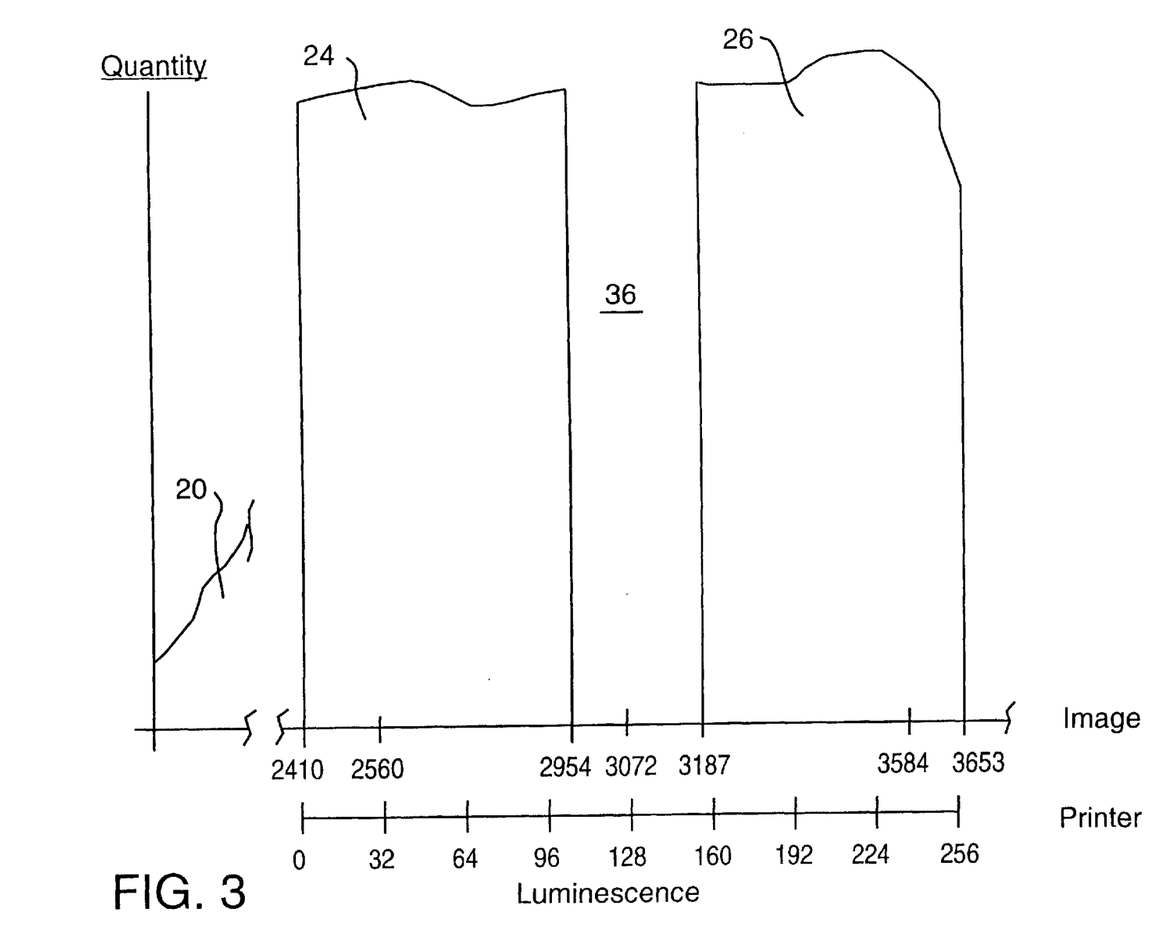
FIG. 3 is an enlarged view of a portion of the histogram of FIG. 2 including a scale of printer luminescence values positioned adjacent the scale of image luminescence values.

With reference to FIG. 3 and with ongoing reference to FIG. 2, electronic images, such as medical diagnostic images, often contain diagnostically useful information in a band of luminescence values less than the distribution of luminescence values. For example, as shown in FIG. 3, the band of luminescence values between 2,410 and 3,653 contains most of the diagnostically useful information. The luminescence values outside this band, however, contains little or no diagnostically useful information, such as background and artifact image information.

In accordance with the present invention, the printer controller 14 scales the band of luminescence values between 2,410 and 3,653 to obtain a plurality of printer luminescence values corresponding to the range of luminescence values printable by the printer 8. Hence, for example, utilizing linear scaling, the image luminescence values 2,410 and 3,653 are scaled to the printer luminescence values 0 and 256, respectively, and the values therebetween are scaled linearly.

As shown in FIG. 3, the scaled band of luminescence values between 2,410 and 3,653 includes groups 24 and 26 of continuous luminescence values that are separated by the band of luminescence values 36 between 2,954 and 3,187 having less than the desired quantity of image luminescence values associated therewith. The scaling, however, can be performed on one group, e.g., 24, of continuous luminescence values or on more than two adjacent groups, e.g., groups 24, 26 and 28, of luminescence values where each group is separated by one or more luminescence values having less than the desired quantity of image luminescence values associated therewith.

The band of luminescence values between 2,410 and 3,653 includes 1,243 luminescence values to be scaled to the 256 printer luminescence values. Scaling the 256 printer luminescence values to the 1,243 image luminescence values results in a scaling factor of approximately 4.86 to 1. In contrast, scaling the 256 printer luminescence values to the 4,096 image luminescence values of the histogram 18 results in a scaling factor of 16 to 1.

In order to print a useful image, the image luminescence values outside the groups of image luminescence values 24 and 26 and the band of luminescence values 36 are assigned one or more predetermined values. For example, image luminescence values below the image luminescence value 2,410 are assigned the printer luminescence value 0, which corresponds to the color black. Similarly, image luminescence values above the image luminescence value 3,653 are assigned the printer luminescence value 256, which corresponds to the color white.

Figure 4A:
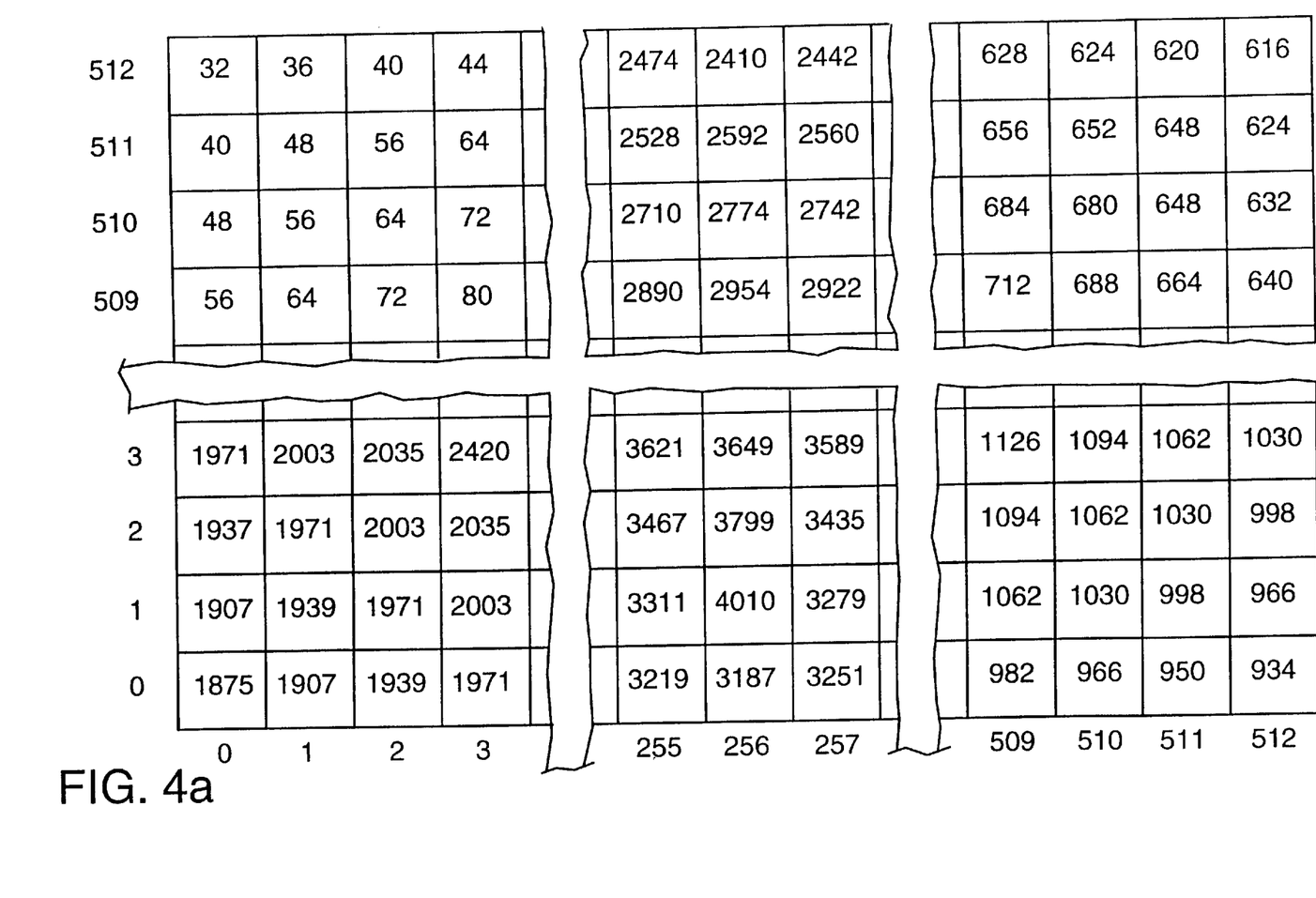
FIG. 4a is a portion of a 512×512 pixel array including the image luminescence values of the histogram of FIG. 2.

With reference to FIG. 4a, image luminescence values are shown distributed in portions of a 512×512 pixel array. The image luminescence values in the pixel array of FIG. 4a are utilized by the printer 8 to generate the histogram 18 shown in FIG. 2. Scaling the image luminescence values of FIG. 4a utilizing the scaling shown in FIG. 3 results in the plurality of printer luminescence values shown in the portions of the 512×512 pixel array of FIG. 4b.

Figure 4B:
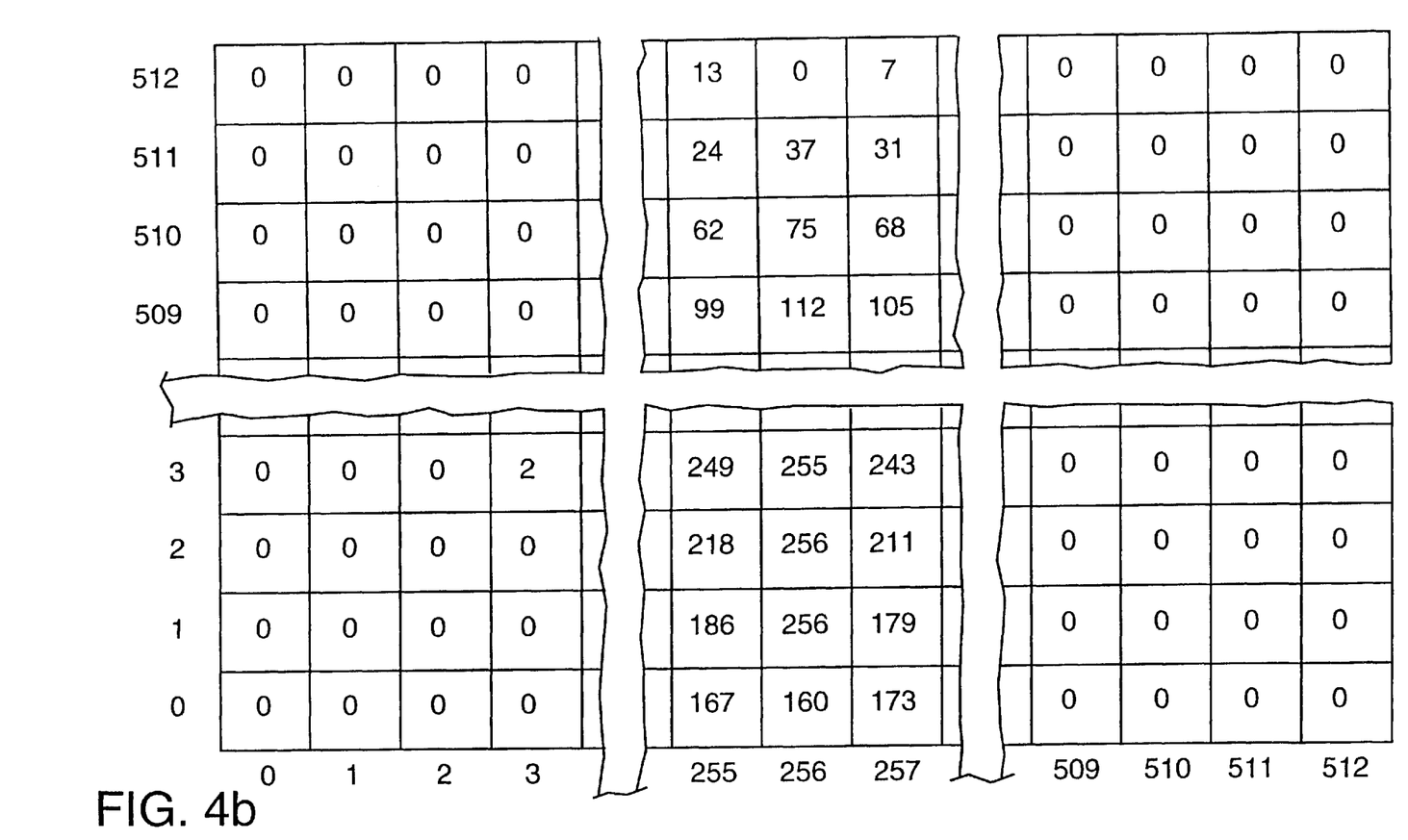
FIG. 4b is the pixel array of FIG. 4a in which the image luminescence values have been replaced with printer luminescence values according to the scaling of printer luminescence values to image luminescence values shown in FIG. 3.

More specifically, utilizing the scaling shown in FIG. 3, the image luminescence value 1,875 for pixel (0,0), in FIG. 4a, is replaced with a printer luminescence value 0. Similarly, the image luminescence values 2,420 and 3,621 for pixels (3,3) and (255,3) are replaced with the printer luminescence values 2 and 249, respectively. The replacement of image luminescence values for each pixel in FIG. 4a, utilizing the scaling shown in FIG. 3, continues until the plurality of printer luminescence values shown in FIG. 4b is obtained. The print engine 16 of the printer 8 prints each printer luminescence value in FIG. 4b in a suitable sequence to obtain a hard copy of the electronic image represented by the printer luminescence values shown in FIG. 3.

As described above, to reduce the scaling factor, one or more predetermined luminescence values are assigned to pixels having luminescence values outside the groups of luminescence values 24 and 26 and the band of luminescence values 36 shown in FIG. 3. In one embodiment, the desired luminescence values are empirically selected. In another embodiment, one or more luminescence values corresponding to a background portion of the electronic image are obtained. Specifically, from the obtained image luminescence values, a median image luminescence value is determined for the background and a predetermined image luminescence value is assigned to each image luminescence value below the median image luminescence value. Preferably, the image luminescence values are obtained from a boundary of the electronic image and more specifically, where the electronic image represents a rectangular image, the image luminescence values are obtained from each corner of the electronic image. Preferably, a plurality of luminescence values are obtained from pixels associated with each corner of the electronic image. More preferably, the plurality of luminescence values from each corner are not adjacent. For example, luminescence values for pixels (0,0), (0,2), and (0,4) of one corner of the electronic image are obtained and utilized to determine the median luminescence value for the background.

Figure 5:
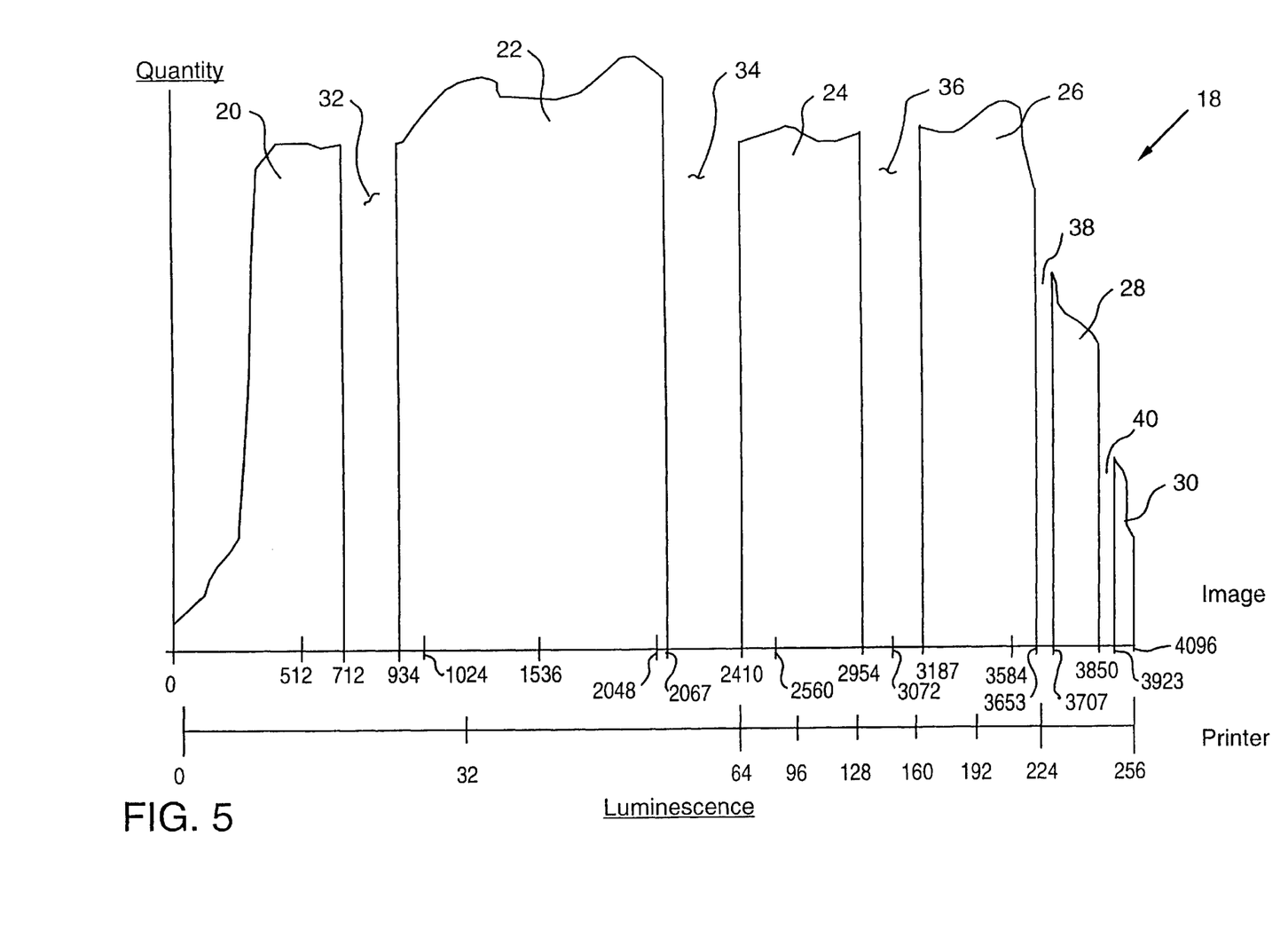
FIG. 5 is the histogram of FIG. 2 including a piecewise linear scale of printer luminescence values.

With reference to FIG. 5, in accordance with another embodiment of the invention, the luminescence values of the histogram 18 are scaled utilizing piecewise scaling. In this embodiment, a majority of the scale of printer luminescence values are associated with the band of luminescence values containing the most diagnostically useful image luminescence values, i.e., the luminescence values between 2,410 and 3,653. As shown in FIG. 5, however, portions of the scale of printer luminescence values are associated with the luminescence values of the histogram 18 between 0 and 2,410 and between 3,653 and 4,096. Specifically, the scale of printer luminescence values between 0 and 64 are associated with the band of luminescence values between 0 and 2,410 and the scale of printer luminescence values between 224 and 256 are associated with the luminescence values between 3,653 and 4,096. Hence, the scale of printer luminescence values between 64 and 224 corresponds to a scaling factor of approximately 7.78; the scale of printer luminescence values between 0 and 64 corresponds to a scaling factor of 37.66; and the scale of printer luminescence values between 224 and 256 correspond to a scaling factor of 13.84.

Figure 6:
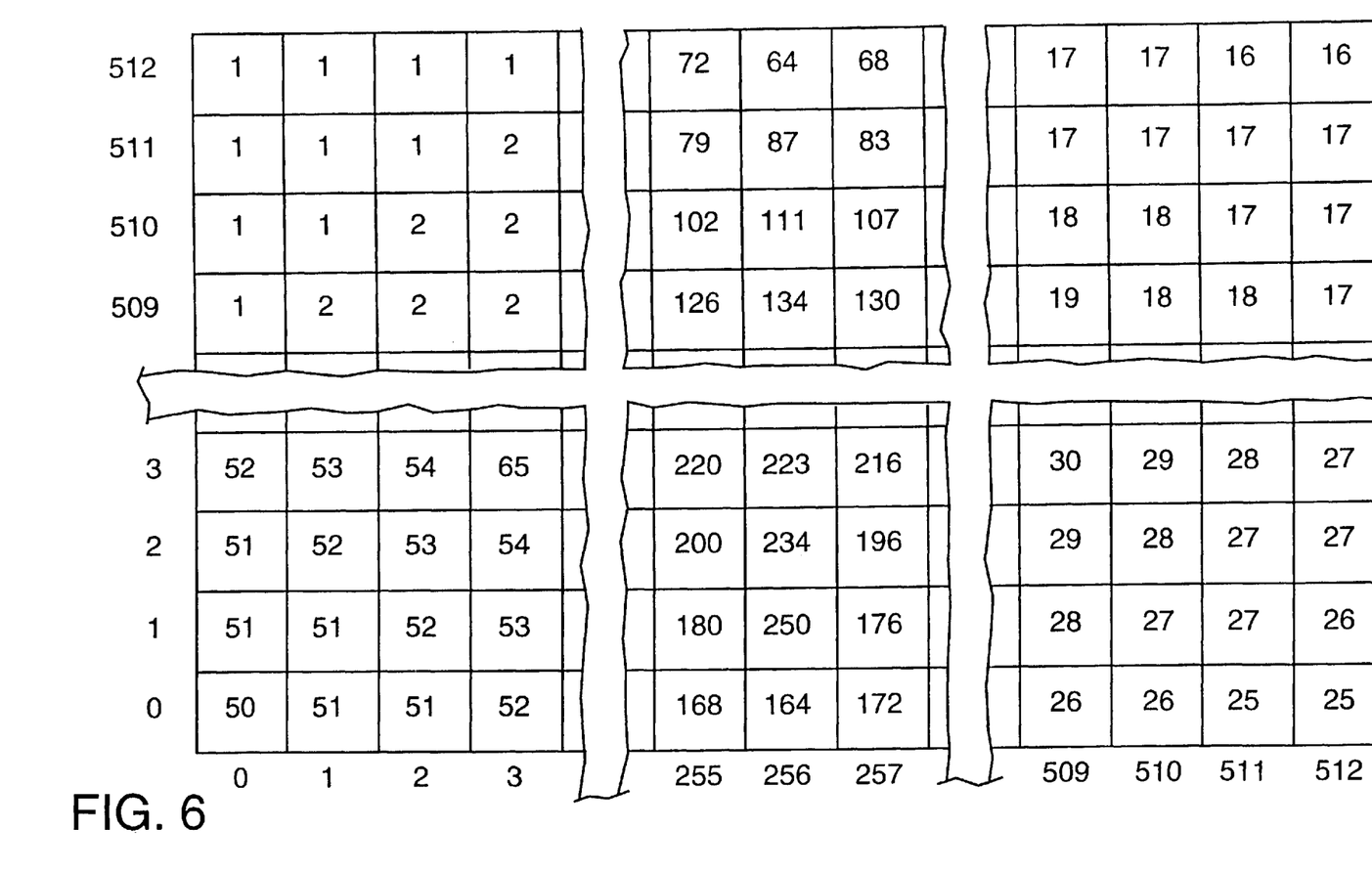
FIG. 6 is the pixel array of FIG. 4a in which the image luminescence values have been replaced with printer luminescence values according to the piecewise linear scaling of printer luminescence values to image luminescence values shown in FIG. 5.

With reference to FIG. 6 and with ongoing reference to FIG. 4a, utilizing the scaling shown in FIG. 5, the image luminescence values shown in the pixel array of FIG. 4a are replaced with the printer luminescence values to produce the pixel array shown in FIG. 6. The printer controller 14 of the printer 8 prints each printer luminescence value in FIG. 6 in a suitable sequence to obtain a hard copy of the electronic image represented by the printer luminescence values shown in FIG. 4a.

In accordance with the present invention, the printer controller 14 adapts the scaling of the printer luminescence values to each image file received thereby. For example, each modality of imaging equipment and/or each manufacture thereof may associate more diagnostically useful image information with different bands of luminescence values in the histogram 18. For example, one modality of imaging equipment may store more diagnostically useful image information in the band of luminescence values between 934 and 2,954, while another modality may associate more diagnostically useful information in the band of luminescence values between 2,410 and 3,850. In accordance with the present invention, the printer controller 14 adapts the scaling of the printer luminescence values to the luminescence values of the histogram 18 in accordance with (i) the modality of imaging equipment, (ii) the manufacturer of the imaging equipment and/or (iii) the image obtained. More specifically, the present invention analyzes and scales the printer luminescence values to the luminescence values of the histogram 18 which contain the most diagnostically useful image luminescence values while avoiding groups of image luminescence values containing less or no diagnostically useful image luminescence values.

Based on the foregoing, it can be seen that the present invention provides a printer which adaptively adjusts the scaling of its printer luminescence values to the luminescence values of a histogram containing one or more groups of image luminescence values containing the most diagnostically useful image information. The present invention also provides a method for adaptively converting the scaling of printer luminescence values to image luminescence values containing more diagnostically useful image information.

The invention has been described with reference to the preferred embodiments. Obvious modifications and alterations will occur to others upon reading and understanding the preceding detailed description. For example, while the invention has been described in connection with linear scaling, non-linear scaling can also be utilized. Moreover, the printer 8 can be programmed to detect a file format of the image file and whether decompression and/or unpacking of the image file is required. Furthermore, where the image file contains color and hue information, the printer can be programmed to detect the color and hue information in the image file for each luminescence value thereof. Moreover, while described in connection with image luminescence values having a bit length of 12 bits and printer luminescence values having a length of 8 bits, the present invention is operable with printer and/or image luminescence values having more or less bits. It is intended that the invention be construed as including all such modifications and alterations insofar as they come within the scope of the appended claims or the equivalents thereof.

We claim:

1. A method of producing a hard copy of an electronic image, the method comprising the steps of:
   (a) receiving a plurality of image luminescence values corresponding to an electronic image, each of the plurality of image luminescence values corresponding to one of a color and a shade of gray of a pixel of the electronic image;
   (b) generating from the plurality of image luminescence values a distribution of image luminescence values;
   (c) determining which luminescence values in the distribution have less than a desired quantity of image luminescence values associated therewith;
   (d) identifying in the distribution a plurality of groups of continuous luminescence values that are separated from each other in the distribution by at least one luminescence value having less than the desired quantity of image luminescence values associated therewith, each luminescence value of each group of continuous luminescence values having greater than or equal to the desired quantity of image luminescence values associated therewith;
   (e) scaling two or more of the plurality of groups of continuous luminescence values and luminescence values therebetween having less than the desired quantity of image luminescence values associated therewith to obtain a plurality of printer luminescence values, wherein the two or more groups of continuous image luminescence values are adjacent;
   (f) performing at least one of the steps of:
      (i) assigning to image luminescence values less than the scaled image luminescence values a first predetermined printer luminescence value; and
      (ii) assigning to image luminescence values greater than the scaled image luminescence values a second predetermined printer luminescence value; and
   (g) printing each printer luminescence value to obtain a hard copy of the electronic image represented by the printer luminescence values, wherein the first and second predetermined printer luminescence values are the same or different.

2. The method as set forth in claim 1, wherein the scaling is one of linear scaling and non-linear scaling.

3. A method of converting to a printed image an electronic image comprised of a plurality image luminescence values, t he method comprising the steps of:
   (a) receiving a plurality of image luminescence values, each image luminescence value corresponding to one of a color and a shade of gray of a pixel of an electronic image;
   (b) forming a histogram of the distribution of the plurality of image luminescence values;
   (c) determining which luminescence values of the histogram have less than a desired quantity of image luminescence values associated therewith;
   (d) identifying from the histogram two or more adjacent groups of continuous image luminescence values, each group separated from an adjacent group by one or more luminescence values having less than the desired quantity of image luminescence values associated therewith;
   (e) scaling the two or more adjacent groups of continuous image luminescence values and the luminescence values therebetween having less than the desired quantity of image luminescence values associated therewith to obtain a plurality of printer luminescence values;
   (f) performing at least one of the steps of:
      (i) assigning to image luminescence values less than the scaled image luminescence values a first predetermined printer luminescence value; and
      (ii) assigning to image luminescence values greater than the scaled image luminescence values a second predetermined printer luminescence value; and
   (g) printing each printer luminescence value to obtain a hard copy of the electronic image represented by the printer luminescence values, wherein the first and second predetermined printer image luminescence values are the same or different.

4. The method as set forth in claim 3, wherein scaling includes piecewise scaling whereby a first scaling factor is utilized to scale the two or more adjacent groups of continuous image luminescence values and the luminescence values therebetween having less than the desired quantity of image luminescence values associated therewith and at least one other scaling factor is utilized to scale the image luminescence values not scaled utilizing the first scaling factor.

5. The method as set forth in claim 4, wherein:
   a second scaling factor is utilized to scale one or more image luminescence values having values less than the image luminescence values scaled utilizing the first scaling factor;

a third scaling factor is utilized to scale one or more image luminescence values having values greater than the image luminescence values scaled utilizing the first scaling factor, wherein:

scaling image luminescence values includes scaling the luminescence values having less than the desired quantity of image luminescence values associated therewith.

6. The method as set forth in claim 5, wherein the first scaling factor, the second scaling factor and the third scaling factor each include at least one of linear scaling and non-linear scaling.

7. The method as set forth in claim 3, wherein each image luminescence value has a bit length greater than a bit length of the printer luminescence value.

8. The method as set forth in claim 3, wherein the desired quantity of image luminescence values is 1.

9. The method as set forth in claim 3, wherein the electronic image represents a rectangular image that includes at least part of an object being imaged; and the method further includes the steps of:

obtaining from each corner of the electronic image an image luminescence value associated with a pixel positioned adjacent thereto;

determining from the obtained image luminescence values a median image luminescence value; and assigning to image luminescence values one of above and below the median image luminescence value a predetermined image luminescence value.

10. A printer for converting to a printed image an electronic image comprised of a plurality of image luminescence values, the printer comprising:

a port for receiving a plurality of image luminescence values, each image luminescence value corresponding to one of a color and a shade of gray of a pixel of an electronic image;

a print engine; and a print controller connected between the port and the print engine, wherein:

the port provides the received plurality of image luminescence values to the print controller;

the print controller forms a histogram of the distribution of the plurality of image luminescence values;

the print controller determines the luminescence values of the histogram having less than a desired quantity of image luminescence values associated therewith;

the print controller identifies from the histogram at least two adjacent groups of continuous luminescence values having therebetween at least one of the luminescence values having less than the desired quantity of image luminescence values associated therewith, each luminescence value of each group having one of greater than and equal to the desired quantity of image luminescence values associated therewith;

the print controller scales the identified at least two adjacent groups of continuous luminescence values and the luminescence values therebetween having less than a desired quantity of image luminescence values associated therewith to obtain a plurality of printer luminescence values;

the print controller (i) assigns to image luminescence values less than the scaled image luminescence values a first predetermined printer luminescence value and/or (ii) assigns to image luminescence values greater than the scaled image luminescence values a second predetermined printer luminescence value, wherein the first and second predetermined printer luminescence values are the same or different; and the print controller causes the print engine to print each printer luminescence value to obtain a printed image corresponding to the electronic image.

11. The printer as set forth in claim 10, wherein the print controller:

obtains from a background portion of the electronic image one or more image luminescence values;

determines from the obtained image luminescence values a median image luminescence value; and assigns the first or second predetermined printer luminescence value to image luminescence values below the median image luminescence value.

12. The printer as set forth in claim 10, wherein the print controller one of linearly and non-linearly scales the image luminescence values of the histogram.

13. The printer as set forth in claim 10, wherein the desired quantity of image luminescence values is 1.

14. The printer as set forth in claim 10, wherein the electronic image is a medical diagnostic image produced utilizing one of an X-ray machine, an ultrasound machine, a CT and an MRI.

15. A method of obtaining a hard copy of an electronic image, the method comprising the steps of:

(a) receiving a plurality of image luminescence values corresponding to pixels of an electronic image, each image luminescence value having a first binary bit length;

(b) generating a probability distribution of the plurality of image luminescence values;

(c) determining from the probability distribution the luminescence values having less than a desired quantity of image luminescence values associated therewith;

(d) identifying from the probability distribution two or more adjacent groups of continuous luminescence values, each luminescence value of each group having one of greater than and equal to the desired quantity of image luminescence values associated therewith, the two or more adjacent groups each being separated by one or more of the luminescence values having less than a desired quantity of image luminescence values associated therewith;

(e) scaling the two or more adjacent groups of image luminescence values and the luminescence values therebetween having less than a desired quantity of image luminescence values associated therewith to obtain a plurality of printer luminescence values, wherein each printer luminescence value has a second bit length less than the first bit length;

(f) performing at least one of the steps of:

(i) assigning to image luminescence values less than the scaled image luminescence values a first predetermined printer luminescence value; and (ii) assigning to image luminescence values greater than the scaled image luminescence values a second predetermined printer luminescence value, wherein the first and second predetermined printer luminescence values are the same or different; and (g) printing the printer luminescence values to obtain a hard copy of the electronic image.

* * * * *

UNITED STATES PATENT AND TRADEMARK OFFICE
CERTIFICATE OF CORRECTION

PATENT NO. : 6,226,398 B1 Page 1 of 1
DATED : May 1, 2001
INVENTOR(S) : Kevin J. O'Neill, Jr. et al.

It is certified that error appears in the above-identified patent and that said Letters Patent is hereby corrected as shown below:

<u>Column 8, claim 3,</u>
Line 23, "t he" should read -- the --.

Signed and Sealed this

Nineteenth Day of February, 2002

Attest:

Attesting Officer

JAMES E. ROGAN
*Director of the United States Patent and Trademark Office*